United States Patent
Fripp et al.

(10) Patent No.: US 11,448,033 B2
(45) Date of Patent: Sep. 20, 2022

(54) DELAY COATING FOR WELLBORE ISOLATION DEVICE

(71) Applicants: HALLIBURTON ENERGY SERVICES, INC., Houston, TX (US); BOARD OF REGENTS, THE UNIVERSITY OF TEXAS SYSTEM, Austin, TX (US)

(72) Inventors: Michael Linley Fripp, Carrollton, TX (US); Xiaoguang Allan Zhong, Plano, TX (US); Kejia Yang, Dallas, TX (US); Walter Voit, Dallas, TX (US); Nelson Yan Loo Lee, Singapore (SG); Yong Dai Tan, Singapore (SG); Bing Hong Chee, Singapore (SG); Ee Wen Wong, Singapore (SG)

(73) Assignees: HALLIBURTON ENERGY SERVICES, INC., Houston, TX (US); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 280 days.

(21) Appl. No.: 16/635,919

(22) PCT Filed: Apr. 5, 2019

(86) PCT No.: PCT/US2019/026010
§ 371 (c)(1),
(2) Date: Jan. 31, 2020

(87) PCT Pub. No.: WO2020/204940
PCT Pub. Date: Oct. 8, 2020

(65) Prior Publication Data
US 2021/0156220 A1 May 27, 2021

(51) Int. Cl.
*E21B 33/12* (2006.01)
*C09K 8/502* (2006.01)
(Continued)

(52) U.S. Cl.
CPC .......... *E21B 33/1208* (2013.01); *C09K 8/502* (2013.01); *C09K 8/5086* (2013.01); *E21B 33/1243* (2013.01)

(58) Field of Classification Search
CPC . E21B 33/1208; E21B 33/1243; C09K 8/502; C09K 8/5086
See application file for complete search history.

(56) References Cited

U.S. PATENT DOCUMENTS

| | | |
|---|---|---|
| 7,562,704 B2 | 7/2009 | Wood et al. |
| 7,681,653 B2 | 3/2010 | Korte et al. |

(Continued)

FOREIGN PATENT DOCUMENTS

| | | |
|---|---|---|
| WO | WO 2008/079486 A1 | 7/2008 |
| WO | WO 2008/140888 A1 | 11/2008 |

(Continued)

OTHER PUBLICATIONS

Search Report for Netherlands Patent Application No. 2024987, prepared by the Netherlands Patent Office, dated Dec. 17, 2020, (8 pgs.).

(Continued)

*Primary Examiner* — Crystal J. Lee
(74) *Attorney, Agent, or Firm* — Haynes and Boone, LLP

(57) ABSTRACT

A wellbore isolation device includes a mandrel, a sealing element disposed around at least a portion of the mandrel, and a delay coating disposed on at least a portion of an outer surface of the sealing element. The sealing element includes (Continued)

a swellable material and the delay coating covers a cross-linked polymer. The delay coating is configured to swell or degrade in a wellbore fluid.

20 Claims, 4 Drawing Sheets

(51) Int. Cl.
*C09K 8/508* (2006.01)
*E21B 33/124* (2006.01)

(56) References Cited

U.S. PATENT DOCUMENTS

| | | | |
|---|---|---|---|
| 8,408,319 B2 | 4/2013 | Chen et al. | |
| 2008/0149351 A1 | 6/2008 | Marya et al. | |
| 2009/0205841 A1 | 8/2009 | Kluge et al. | |
| 2010/0314134 A1* | 12/2010 | Nutley | E21B 33/1208 166/131 |
| 2013/0092394 A1 | 4/2013 | Holderman et al. | |
| 2014/0102728 A1 | 4/2014 | Gamstedt et al. | |
| 2016/0115759 A1* | 4/2016 | Richards | E21B 33/16 166/378 |
| 2018/0305996 A1* | 10/2018 | Duan | E21B 23/06 |
| 2019/0055807 A1 | 2/2019 | Sadana et al. | |

FOREIGN PATENT DOCUMENTS

| | | | |
|---|---|---|---|
| WO | WO 2017/151118 A1 | 9/2017 | |
| WO | WO-2017151118 A1 * | 9/2017 | E21B 33/12 |

OTHER PUBLICATIONS

International Search Report and Written Opinion issued for Application No. PCT/US2019/026010, ISA/KR, dated Jan. 6, 2020, 13 pages.

Ting Yang, "Mechanical and Swelling Properties of Hydrogels," KTH Chemical Science and Engineering, Dec. 6, 2012, (2012) Ting Yang, 77 pages.

Matthew J. Kade, Daniel J. Burke, Craig J. Hawker, "The Power of Thiol-ene Chemistry," Journal of Polymer Science: Part A: Polymer Chemistry, vol. 48, pp. 743-750 (2010), 8 pages.

* cited by examiner

DELAY COATING FOR WELLBORE ISOLATION DEVICE

CROSS-REFERENCE TO RELATED APPLICATION

The present application is a U.S. National Stage patent application of International Patent Application No. PCT/US2019/026010, filed on Apr. 5, 2019, the benefit of which is claimed and the disclosure of which is incorporated herein by reference in its entirety.

TECHNICAL FIELD

The present disclosure relates generally to downhole tools and operations related to oil and gas exploration, drilling and production. More particularly, embodiments of the disclosure relate to a degradable delay coating for swellable packers, a swellable packer construction including a degradable delay coating, and methods of using the same.

BACKGROUND OF THE DISCLOSURE

Hydrocarbons (e.g., oil, gas, etc.) are commonly produced from hydrocarbon-bearing portions of a subterranean formation via a wellbore penetrating the formation. Oil and gas wells are often cased from the surface location of the wells down to, and sometimes through, a subterranean formation. A casing string or liner (e.g., steel pipe) is generally lowered into the wellbore to a desired depth. Often, at least a portion of the space between the casing string and the wellbore, i.e., the annulus, is then filled with cement (e.g., cemented) to secure the casing string within the wellbore. Once the cement sets in the annulus, it holds the casing string in place and prevents flow of fluids to, from, or between various portions of a subterranean formation through which the well passes.

During the drilling, servicing, completing, and/or reworking of wells (e.g., oil and/or gas wells), a great variety of downhole wellbore servicing tools are used. For example, but not by way of limitation, it is often desirable to isolate two or more portions of a wellbore, such as during the performance of a stimulation (e.g., perforating and/or fracturing) operation. Additionally, or alternatively, it may also be desirable to isolate various portions of a wellbore during completion operations. Downhole wellbore servicing tools (i.e., isolation tools) generally including packers and/or plugs are designed for these general purposes. Packers may also be utilized to secure a casing string within a wellbore. For example, a packer may be provided around an outer cylindrical surface of a tubing string (e.g., a completion string), which may be run into an outer tubular structure such as a casing string or an uncased portion of a wellbore. The packer may be radially expanded into contact with the inner surface of the outer tubular structure to create a seal in an annulus defined between the tubing string and the outer tubular structure. In some systems, mechanical or hydraulic systems may be employed to expand the packer. In other systems, the packer may be induced to expand by exposing swellable element in the packer to a predetermined trigger fluid in the wellbore.

Swellable packers may include an elastomeric element that is selected to expand in response to exposure to a particular trigger fluid. The trigger fluid may be a fluid present in the wellbore, e.g., a hydrocarbon based fluid, or a fluid pumped into the wellbore from the surface. Swellable packers may offer reliability and robustness in long term sealing applications. In some instances, a swellable packer may begin to expand prior to reaching the intended location in the wellbore. For example, a swellable packer being run into a wellbore on a conveyance, e.g., tubing string, coiled tubing, wireline, or slickline, may only reach the intended depth after a time period of about two days, and the swellable packer may be exposed to the trigger fluid throughout this time period. If there are unexpected delays in placing the packer, the swellable packer may contact an outer tubular structure at an unintended location. Continued swelling of the packer may cause the packer and/or the conveyance to become stuck in the wellbore.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
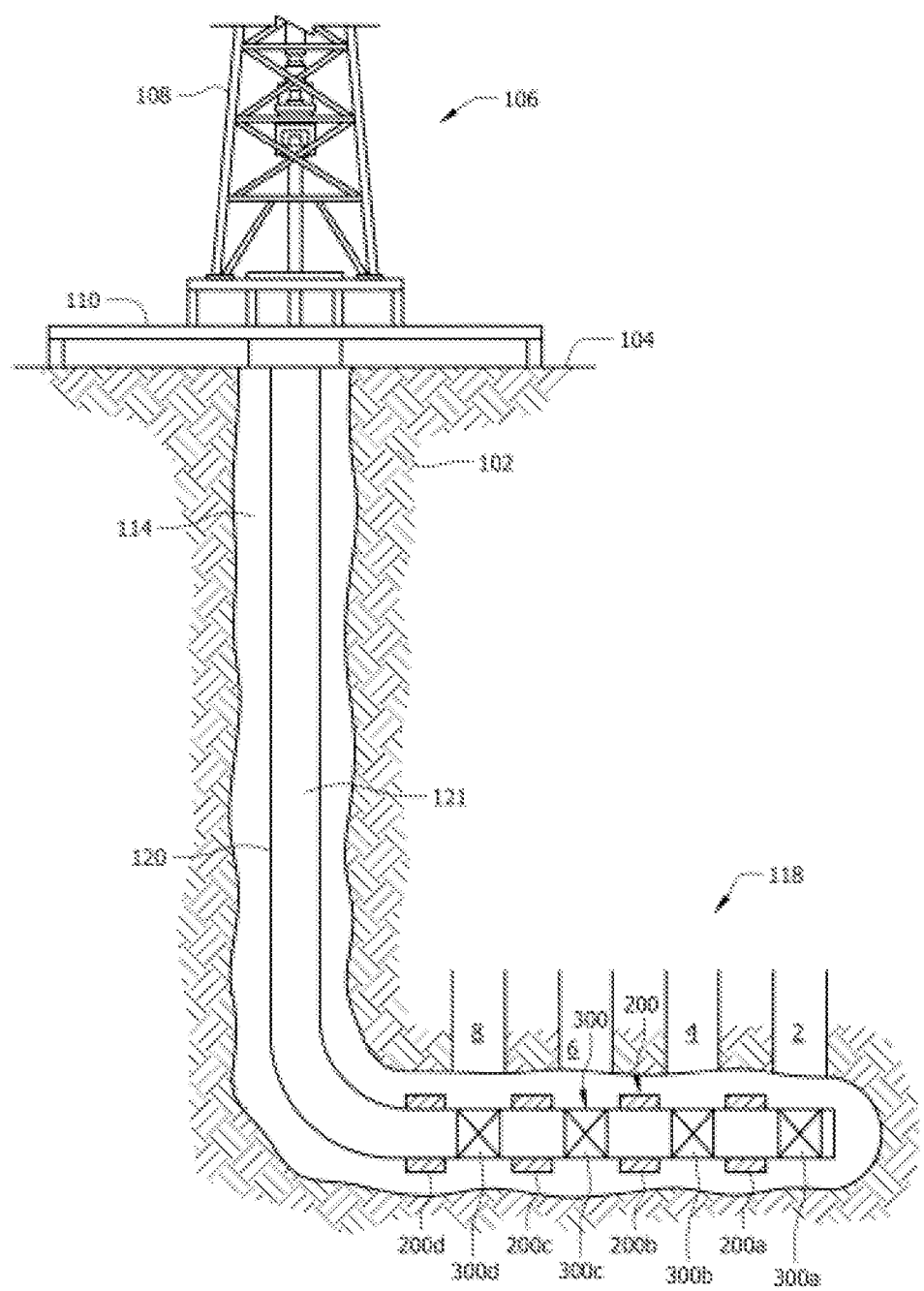
FIG. 1 is a simplified cutaway view of an embodiment of an environment in which a swellable packer may be employed.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, an embodiment of an operating environment in which a wellbore servicing apparatus and/or system may be employed is illustrated. It is noted that although some of the figures may exemplify horizontal or vertical wellbores, the principles of the apparatuses, systems, and methods disclosed may be similarly applicable to horizontal wellbore configurations, conventional vertical wellbore configurations, deviated wellbore configurations, and any combination thereof. Therefore, the horizontal, deviated, or vertical nature of any figure is not to be construed as limiting the wellbore to any particular configuration.

As depicted in FIG. 1, the operating environment generally includes a wellbore 114 that penetrates a subterranean formation 102 including a plurality of formation zones 2, 4, 6, and 8 for the purpose of recovering hydrocarbons, storing hydrocarbons, disposing of carbon dioxide, or the like. The wellbore 114 may extend substantially vertically away from the earth's surface over a vertical wellbore portion or may deviate at any angle from the earth's surface 104 over a deviated or horizontal wellbore portion 118. In alternative operating environments, portions or substantially all of the wellbore 114 may be vertical, deviated, horizontal, and/or curved. The wellbore 114 may be drilled into the subterranean formation 102 using any suitable drilling technique. In an embodiment, a drilling or servicing rig 106 disposed at the surface 104 includes a derrick 108 with a rig floor 110 through which a tubular string (e.g., a drill string, a tool string, a segmented tubing string, a jointed tubing string, or any other suitable conveyance, or combinations thereof) generally defining an axial flowbore may be positioned within or partially within the wellbore 114. In an embodiment, the tubular string may include two or more concentrically positioned strings of pipe or tubing (e.g., a first work string may be positioned within a second work string). The drilling or servicing rig 106 may include a motor driven winch and other associated equipment for lowering the tubular string into the wellbore 114. Alternatively, a mobile workover rig, a wellbore servicing unit (e.g., coiled tubing units), or the like may be used to lower the work string into the wellbore 114. In such an embodiment, the tubular string may be utilized in drilling, stimulating, completing, or otherwise servicing the wellbore, or combinations thereof. While FIG. 1 depicts a stationary drilling rig 106, one of ordinary skill in the art will readily appreciate that mobile workover rigs, wellbore servicing units (such as coiled tubing units), and the like may be employed.

In the embodiment of FIG. 1, at least a portion of the wellbore 114 is lined with a wellbore tubular 120 such as a casing string and/or liner defining an axial flowbore 121. In the embodiment of FIG. 1, at least a portion of the wellbore tubular 120 is secured into position against the formation 102 via a plurality of swellable packers 200 (e.g., a first swellable packer 200a, a second swellable packer 200b, a third swellable packer 200c, and a fourth swellable packer 200d). In any embodiment, one or more of the swellable packers may be a controlled swell-rate swellable packer (CSSP). Additionally, in any embodiment, at least a portion of the wellbore tubular 120 may be partially secured into position against the formation 102 with cement. In additional or alternative operating environments, the swellable packer 200, or a swellable packer substantially identical to the swellable packer 200, as will be disclosed herein, may be similarly incorporated within (and similarly utilized to secure) any suitable tubular string and used to engage and/or seal against an outer tubular string or an open-hole portion of the wellbore 114. Examples of such a tubular string include, but are not limited to, a work string, a tool string, a segmented tubing string, a jointed pipe string, a coiled tubing string, a production tubing string, a drill string, and the like, or combinations thereof. In an embodiment, the swellable packer 200, or a swellable packer substantially identical to the swellable packer 200, may be used to isolate two or more adjacent portions or zones of the subterranean formation 102 within the wellbore 114.

Referring still to FIG. 1, the wellbore tubular 120 may further have incorporated therein at least one wellbore servicing tool (WST) 300 (e.g., a first WST 300a, a second WST 300b, a third WST 300c, and a fourth WST 300d). In an embodiment, one or more of the WSTs 300 may include an actuatable stimulation assembly, which may be configured for the performance of a wellbore servicing operation, such as, e.g., a stimulation operation. Various stimulation operations can include, but are not limited to a perforating operation, a fracturing operation, an acidizing operation, or any combination thereof.

Figure 2:
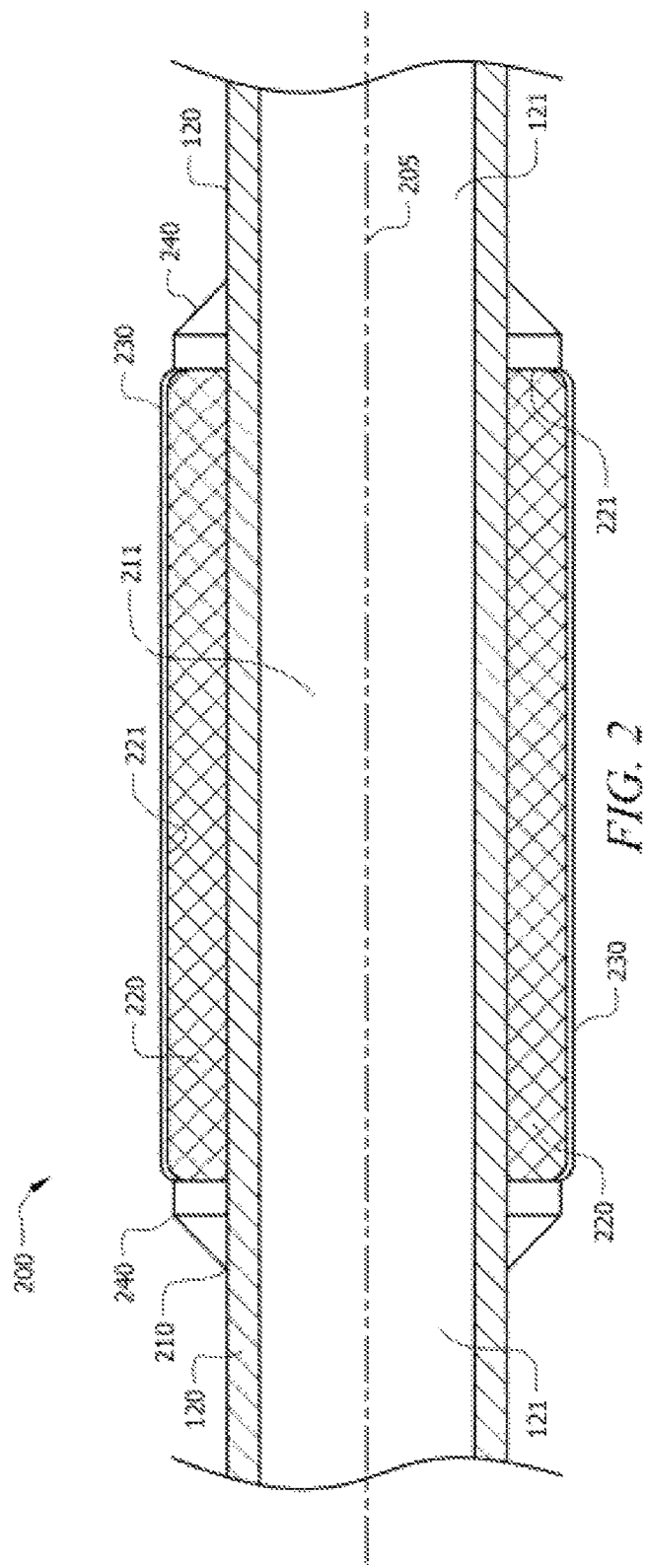
FIG. 2 is a cross-sectional view of an embodiment of a swellable packer.

Referring to FIG. 2, an embodiment of the swellable packer 200 is illustrated. In the embodiment of FIG. 2, the swellable packer 200 generally includes a mandrel 210, a swellable sealing element 220 disposed circumferentially about/around at least a portion of the mandrel 210, and a coating 230 covering at least a portion of an outer surface 221 of the sealing element 220. Also, the swellable packer 200 may extend along and define a central or longitudinal axis 205.

In an embodiment, the mandrel 210 generally includes a cylindrical or tubular structure or body. The mandrel 210 may be coaxially aligned with the central axis 205 of the swellable packer 200. In an embodiment, the mandrel 210 may include a unitary structure (e.g., a single unit of manufacture, such as a continuous length of pipe or tubing); alternatively, the mandrel 210 may include two or more operably connected components (e.g., two or more coupled sub components, such as by a threaded connection). The tubular body of the mandrel 210 generally defines a continuous axial flowbore 211 that allows fluid movement through the mandrel 210.

In an embodiment, the mandrel 210 may be configured for incorporation into the wellbore tubular 120; alternatively, the mandrel 210 may be configured for incorporation into any suitable tubular string, such as for example a work string, a tool string, a segmented tubing string, a jointed pipe string, a coiled tubing string, a production tubing string, a drill string, and the like, or combinations thereof. In such an embodiment, the mandrel 210 may include a suitable connection to the wellbore tubular 120 (e.g., to a casing string member, such as a casing joint). In such an embodiment, the mandrel 210 is incorporated within the wellbore tubular 120 such that the axial flowbore 211 of the mandrel 210 is in fluid communication with the axial flowbore 121 of the wellbore tubular 120.

In an embodiment, the swellable packer 200 may include one or more optional retaining elements 240. Generally, the optional retaining elements 240 may be disposed circumferentially about the mandrel 210 adjacent to and abutting the sealing element 220 on opposing sides of the sealing element 220, as seen in the embodiment of FIG. 2. Alternatively, one of the optional retaining elements 240 may be omitted so that the remaining one of the optional retaining elements 240 is disposed circumferentially about the mandrel 210 adjacent to and abutting the sealing element 220 on one side only, such as for example on a lower side of the sealing element 220, or on an upper side of the sealing element 220. The optional retaining element 240 may be secured onto the mandrel 210 by any suitable retaining mechanism, such as, e.g., screws, pins, shear pins, retaining bands, and the like, or combinations thereof. The optional retaining element 240 may include a plurality of elements, including but not limited to one or more spacer rings, one or more slips, one or more slip segments, one or more slip wedges, one or more extrusion limiters, and the like, or combinations thereof. In any embodiment, the optional retaining element 240 may prevent or limit the longitudinal movement (e.g., along the central axis 205) of the sealing element 220 in relation to the mandrel 210, while the sealing element 220 disposed circumferentially about the mandrel 210 is placed within the wellbore 114 adjacent the subterranean formation 102. In an embodiment, the optional retaining elements 240 may prevent or limit longitudinal expansion (e.g., along the central axis 205) of the sealing element 220, while allowing radial expansion of the sealing element 220.

In an embodiment, the sealing element 220 may generally be configured to selectively seal and/or isolate two or more portions of an annular space surrounding the mandrel 210 (e.g., between the mandrel 210 and one or more walls of the wellbore 114), for example, by selectively providing a barrier extending circumferentially around at least a portion of the exterior of the mandrel 210. In an embodiment, the sealing element 220 may generally include a hollow cylindrical structure having an interior bore (e.g., a tube-like and/or a ring-like structure). The sealing element 220 may include a suitable internal diameter, a suitable external diameter, and/or a suitable thickness, e.g., as may be selected in consideration of factors including, but not limited to, the size/diameter of the mandrel 210, the wall surface(s) against which the sealing element is configured to engage, the force with which the sealing element is configured to engage such wall surface(s), or other related factors. For example, the internal diameter of the sealing element 220 may be about the same as an external diameter of the mandrel 210. In any embodiment, the sealing element 220 may be in sealing contact (e.g., a fluid-tight seal) with the mandrel 210. While the embodiment of FIG. 2 illustrates a swellable packer 200 including a single sealing element 220, the swellable packer 200 may instead include two, three, four, five, or any other suitable number of sealing elements like the sealing element 220.

The sealing element 220 may be constructed of a "swellable material" such that exposure to a trigger fluid the wellbore 114 may induce swelling of the sealing element 104 in a radial direction. For purposes of this disclosure, a "swellable material" may include any material (e.g., a polymer or an elastomer) that swells (e.g., exhibits an increase in mass and volume) upon contact or exposure with a selected fluid, i.e., a trigger fluid or swelling agent. Herein the disclosure may refer to a polymer and/or a polymeric material. It is to be understood that the terms polymer and/or polymeric material herein are used interchangeably and are meant to each refer to compositions including at least one polymerized monomer in the presence or absence of other additives traditionally included in such materials. Examples of polymeric materials suitable for use as part of the swellable material of the sealing element 220 include, but are not limited to homopolymers, random, block, graft, star-branched and hyper-branched polyesters, copolymers thereof, derivatives thereof, or combinations thereof. The term "derivative" herein is defined to include any compound that is made from one or more of the swellable materials, for example, by replacing one atom in the swellable material with another atom or group of atoms, rearranging two or more atoms in the swellable material, ionizing one of the swellable materials, or creating a salt of one of the swellable materials. The term "copolymer" as used herein is not limited to the combination of two polymers, but includes any combination of any number of polymers, e.g., graft polymers, terpolymers, and the like. The extent of swelling of a sealing element 220 may depend upon a variety of factors, including the downhole environmental conditions (e.g., temperature, pressure, composition of formation fluid in contact with the sealing element 220, specific gravity of the fluid, pH, salinity, etc.).

The coating 230 may be configured to degrade, at least partially, in wellbore fluids. In any embodiment, the wellbore fluids may include a water-based fluid (e.g., aqueous solutions, water, etc.), an oil-based fluid (e.g., hydrocarbon fluid, oil fluid, oleaginous fluid, terpene fluid, diesel, gasoline, xylene, octane, hexane, etc.), or combinations thereof. A commercial nonlimiting example of an oil-based fluid includes Environmental Drilling Compound (EDC) fluids produced by TOTAL. Because the sealing element 220 includes the coating 230 covering at least a portion thereof, swelling of the sealing element 220 may be selectively delayed by the coating 230. Upon exposure to wellbore fluids, permeability of the coating 230 increases and eventually at least a part thereof degrades. The coating 230 may degrade by dissolving, swelling, or a combination of dissolving and swelling. In this regard, a material is deemed to be dissolved when a tensile strength of the material is below 500 psi.

The dissolution rate of the coating 230 is not particularly limited and may be appropriately adapted based on, e.g., the operating environment. A variety of factors may affect the dissolution rate of the coating 230, including, e.g., thickness of the coating 230, composition (including presence of additives) and chemistry (e.g., degree of cross-linking) of the coating 230, composition of the wellbore fluids (e.g., water content, pH), and temperature of the wellbore fluids. According to embodiments of the present disclosure, the coating 230 may be precisely adapted to achieve a desired dissolution rate within a given operating environment.

In any embodiment, the average dissolution rate of the coating 230, measured in water at a temperature of 200° F., may be at least 0.01 mm/day, at least 0.05 mm/day, at least 0.10 mm/day, at least 0.15 mm/day, at least 0.20 mm/day, at least 0.25 mm/day, at least 0.30 mm/day, at least 0.35 mm/day, at least 0.40 mm/day, at least 0.45 mm/day, at least 0.50 mm/day, at least 0.55 mm/day, at least 0.60 mm/day, at least 0.65 mm/day, at least 0.70 mm/day, or at least 0.75 mm/day. In any embodiment, the average dissolution rate of the coating 230, measured in water at a temperature of 200° F., may be at most 1.0 mm/day, at most 0.95 mm/day, at most 0.90 mm/day, at most 0.85 mm/day, at most 0.80 mm/day, at most 0.75 mm/day, at most 0.70 mm/day, at most 0.65 mm/day, at most 0.60 mm/day, at most 0.55 mm/day, at most 0.50 mm/day, at most 0.45 mm/day, at most 0.40 mm/day, at most 0.35 mm/day, at most 0.30 mm/day, at most 0.25 mm/day, at most 0.20 mm/day, at most 0.15 mm/day, or at most 0.10 mm/day. It will be appreciated that, in any embodiment, the average dissolution rate of the coating 230 may range between any of the foregoing minimum rates and maximum rates, e.g., from 0.01 mm/day to 1.0 mm/day, from 0.05 mm/day to 1.0 mm/day, from 0.05 mm/day to 0.75 mm/day, from 0.10 mm/day to 0.75 mm/day, etc.

In some embodiments, the coating 230 may prevent any swelling of the sealing element 220 for an initial period of time, e.g., for at least 12 hours, for at least 18 hours, for at least 1 day, for at least 2 days, for at least 3 days, for at least 4 days, for at least 5 days, for at least 6 days, or for at least 7 days. The initial period may be, e.g., at most 10 days, at most 9 days, at most 8 days, at most 7 days, at most 6 days, at most 5 days, at most 4 days, at most 3 days, at most 2 days, or at most 1 day. After the initial period, the coating 230 degrades and swelling of the sealing element 220 accelerates. That is, the coating 230 may provide very little or no fluid transfer to the sealing element 220 initially but may allow an increasing amount of fluid transfer as the coating 230 degrades.

In any embodiment, the coating 230 may provide at least a substantially fluid-tight seal to the portion of the outer surface 221 of the sealing element 220 that it covers. For example, the coating 230 may serve to prevent and/or limit direct contact between a fluid (e.g., a swelling agent) and the portion of the outer surface 221 of the sealing element 220 that is covered by the coating 230. In an embodiment, the coating 230 may be impervious or impermeable with respect to the swelling agent. In an embodiment, the coating 230 may be substantially impervious or impermeable with respect to the swelling agent. In an embodiment, the coating 230 may have a low permeability with respect to the swelling agent. In an embodiment, the coating 230 may allow less than 20, alternatively less than 15, alternatively less than 10, alternatively less than 9, alternatively less than 8, alternatively less than 7, alternatively less than 6, alternatively less than 5, alternatively less than 4, alternatively less than 3, alternatively less than 2, alternatively less than 1, alternatively less than 0.1, alternatively less than 0.01, or alternatively less than 0.001% of the outer surface area 221 that is sealingly covered by the coating 230 to be in direct contact with a swelling agent.

In some embodiments, the coating 230 may include a water-degradable material, an oil-degradable material, a combination of a water-degradable material and an oil-degradable material, or a water-and-oil-degradable material. Nonlimiting examples of water-degradable materials suitable for use in the present disclosure include tetrafluoroethylene/propylene copolymer (TFE/P), a starch-polyacrylate acid graft copolymer, a polyvinyl alcohol/cyclic acid anhydride graft copolymer, an isobutylene/maleic anhydride copolymer, a vinyl acetate/acrylate copolymer, polyethylene oxide polymer, graft-poly(ethylene oxide) of poly(acrylic acid), a carboxymethyl cellulose type polymer, a starch-polyacrylonitrile graft copolymer, polymethacrylate, polyacrylamide, an acrylamide/acrylic acid copolymer, poly(2-hydroxyethyl methacrylate), poly(2-hydroxypropyl methacrylate), a non-soluble acrylic polymer, a highly swelling clay mineral, sodium bentonite (e.g., sodium bentonite having as main ingredient montmorillonite), calcium bentonite, and the like, derivatives thereof, or combinations thereof. Nonlimiting examples of oil-degradable materials suitable for use in the present disclosure include an oil-swellable rubber, a natural rubber, a polyurethane rubber, an acrylate/butadiene rubber, a butyl rubber (IIR), a brominate, butyl rubber (BIIR), a chlorinated butyl rubber (CIIR), a chlorinated polyethylene rubber (CM/CPE), an isoprene rubber, a chloroprene rubber, a neoprene rubber, a butadiene rubber, a styrene/butadiene copolymer rubber (SBR), a sulphonated polyethylene (PES), chlorosulphonated polyethylene (CSM), an ethylene/acrylate rubber (EAM, AEM), an epichlorohydrin/ethylene oxide copolymer rubber (CO, ECO), an ethylene/propylene copolymer rubber (EPM), ethylene/propylene/diene terpolymer (EPDM), a peroxide crosslinked ethylene/propylene copolymer rubber, a sulfur crosslinked ethylene/propylene copolymer rubber, an ethylene/propylene/diene terpolymer rubber (EPT), an ethylene/vinyl acetate copolymer, a fluoro silicone rubber (FVMQ), a silicone rubber (VMQ), a poly 2,2,1-bicyclic heptene (polynorbornene), an alkylstyrene polymer, a crosslinked substituted vinyl/acrylate copolymer, and the like, derivatives thereof, or combinations thereof. Nonlimiting examples of water-and-oil-degradable materials suitable for use in the present disclosure include a nitrile rubber (NBR), an acrylonitrile/butadiene rubber, a hydrogenated nitrile rubber (HNBR), a highly saturated nitrile rubber (HNS), a hydrogenated acrylonitrile/butadiene rubber, an acrylic acid type polymer, poly(acrylic acid), polyacrylate rubber, a fluoro rubber (FKM), a perfluoro rubber (FFKM), and the like, derivatives thereof, or combinations thereof. A water-degradable material might exhibit some degree of oil-degradability (e.g., degrading when contacted with an oil-based fluid). Similarly, an oil-degradable material might exhibit some degree of water-degradability (e.g., degrading when contacted with a water-based fluid).

Other degradable materials that behave in a similar fashion with respect to oil-based fluids and/or water-based fluids may also be suitable. An appropriate degradable material for use in the compositions of the present disclosure may be selected based on a variety of factors, including the application in which the composition will be used and the desired degrading characteristics. For instance, in any embodiment, the sealing element 220 may be configured to swell in one fluid while the coating 230 may be configured to swell or degrade in a second fluid different from the first fluid.

In some embodiments, the coating 230 may include a cross-linked polymer. Such polymer may be cross-linked by, e.g., heat, change in pH, or radiation. Radiation may include, e.g., ultraviolet radiation, infrared radiation, or microwave radiation. In some embodiments, the polymer is cross-linked using click chemistry. "Click chemistry" generally refers to reactions that are high yielding, wide in scope, create only byproducts that can be removed without chromatography, are stereospecific, simple to perform, and can be conducted in easily removable or benign solvents. Nonlimiting examples of click chemistry include thiol-ene reactions, Diels-Alder reactions, nucleophilic ring opening reactions of epoxides and aziridines, non-aldol type carbonyl reactions such as formation of hydrazones and heterocycles, additions to carbon-carbon multiple bonds such as oxidative formation of epoxides and Michael Additions, and cycloaddition reactions.

In some embodiments, the coating 230 may include a thiol polymer (i.e., a polymer having a thiol group) formed by a thiol-ene reaction. A thiol-ene reaction is generally a reaction of thiols with unsaturated functional groups or monomers. Thiol-ene reactions involve the addition of an S—H bond across a double or triple bond by either a free radical or ionic mechanism. Nonlimiting examples of functional groups or monomers in thiol-ene reactions include maleimides, acrylates, norbornenes, carbon-carbon double bonds, and Michael-type nucleophilic addition. In some embodiments, the thiol-ene reaction may be facilitated by a photoinitiator or may be thermally initiated.

A swellable functional group or a degradable functional group may be added in the thiol polymer. The swellable functional group may include, e.g., a polyethylene glycol-based hydrogel, an aerogel, poly(lactic acid), poly(glycolic acid), an allyl, an acrylate, poly(vinyl alcohol) (PVA), poly (N-isopropylacrylamide) (PNIPAAM). In embodiments including a degradable acrylate monomer, the degradation typically involves a swelling process as the thiol polymer is hydrolytically degraded. For example, the presence of ester bonds within the swellable functional group tends to render a thiol-ene hydrogel hydrolytically degradable. In such embodiments, the rate of degradation can be controlled by the ester bond hydrolysis and by the degree of network cross-linking. In some embodiments, any one or more of the thiol group, a bond between the thiol group and the functional group, or a third component held within the cross-linking may swell or degrade in a wellbore fluid.

In any embodiment, additives may be included in the coating 230. Such additives may be used for, e.g., increased strength, stiffness, or creep resistance, and may include, e.g. particles, fibers, or weaves. For example, a glass reinforced thiol polymer may be able to provide enhanced strength and creep resistance at the expense of reduced elongation. Nonlimiting examples of additives include carbon fibers, nanotubes, graphene, fullerenes, ceramic fibers, plastic fibers, glass fibers, metal fibers, as well as particulate, granular, long fiber, short fiber, and woven fiber versions. Such additives may be added to tailor the mechanical properties of the coating 230.

In some embodiments, the glass transition temperature (Tg) of the coating 230 is above room temperature. For example, the coating 230 may have a Tg of at least 75° F., at least 80° F., at least 85° F., at least 90° F., at least 95° F., or at least 100° F. Additionally, the coating 230 may have a Tg of at most 180° F., at most 170° F., at most 160° F., at most 150° F., at most 140° F., or at most 130° F. It will be appreciated that the Tg of the coating 230 may range between any of the foregoing example upper and lower limits, e.g., in some embodiments, the Tg may be from 75° F. to 180° F., from 80° F. to 180° F., from 85° F. to 170° F., from 90° F. to 160° F., from 95° F. to 150° F., from 95° F. to 140° F., etc.

The coating 230 may be provided on the sealing element 220 in any suitable form. In some embodiments, the coating 230 is applied as a liquid that solidifies onto the sealing element 220. In some embodiments, the liquid may be sprayed onto the sealing element 220 and treated with radiation to cure or solidify the liquid. The liquid may, e.g., include a cross-linkable polymer, and the treatment may cause cross-linking of the polymer. Radiation may include, e.g., ultraviolet radiation, infrared radiation, or microwave radiation. In other embodiments, the liquid may be sprayed onto the sealing element 220 and then a second liquid may be applied to the liquid to cure the liquid. In such embodiments, the second liquid may include, e.g., a catalyst, cross-linking agent, or hardener.

Figure 3:
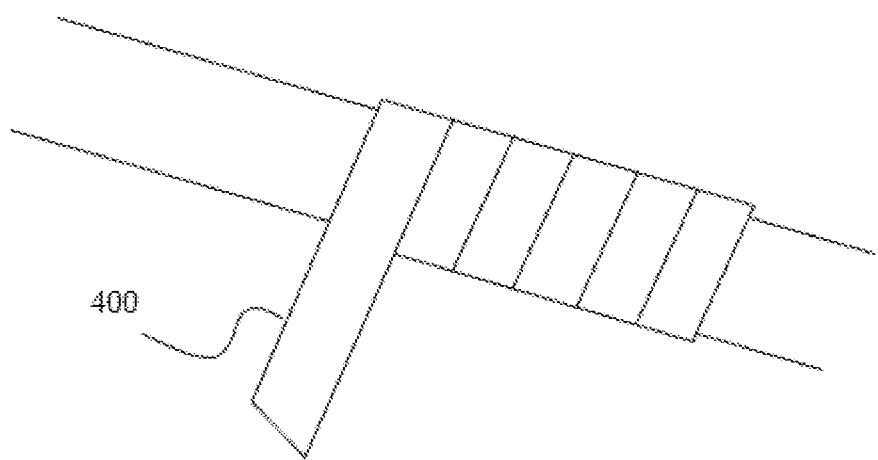
FIG. 3 is a side elevation of an embodiment of a coating tape for a swellable packer.

In some embodiments, the coating 230 may be in the form of a tape 400 wound around or adhered to the outer surface 221 of the sealing element 220. FIG. 3 depicts one such embodiment. The tape 400 may include an adhesive on at least a portion of at least one surface thereof. The adhesive may be configured to adhere the tape 400 onto the outer surface 221 of the sealing element 220. In embodiments where the tape 400 is wound around the sealing element 220 such that the tape 400 at least partially overlaps itself (e.g., as shown in FIG. 3), the adhesive may additionally or alternatively be configured to adhere the tape 400 to itself in overlapping regions thereof. In some embodiments, the overlapping regions of the wound tape 400 may be treated with radiation or heated (i.e., vulcanized) to secure the tape 400 around the sealing element 220. The radiation may include, e.g., ultraviolet radiation, infrared radiation, or microwave radiation. In some embodiments, a liquid, e.g., a liquid including a catalyst, may be applied to the wound tape 400 to secure the wound tape 400 around the sealing element 220. In some embodiments, the tape 400 may be wound around the sealing element 220 and secured at longitudinal ends, e.g., at the optional retaining elements 240. Any other suitable modes of securing the tape 400 to the outer surface 221 of the sealing element 220 may be employed.

In any embodiment, the average thickness of the coating 230, measured in a radial direction, is not particularly limited. For instance, the average thickness may be 1 μm to 10 mm, 1 μm to 5 mm, 1 μm to 1 mm, 10 μm to 5 mm, 10 μm to 1 mm, 10 μm to 500 μm, 10 μm to 250 μm, 10 μm to 100 μm, or 100 μm to 500 μm. In any embodiment, the thickness of the coating may be uniform, i.e., within 5% of the average thickness, within 2% of the average thickness, within 1% of the average thickness, within 0.5% of the average thickness, or within 0.1% of the average thickness. A uniform thickness of the coating 230 may avoid issues such as uneven degradation or swelling of the coating 230 or damage to the coating 230 when running in due to protrusions or irregularities.

Figure 4:
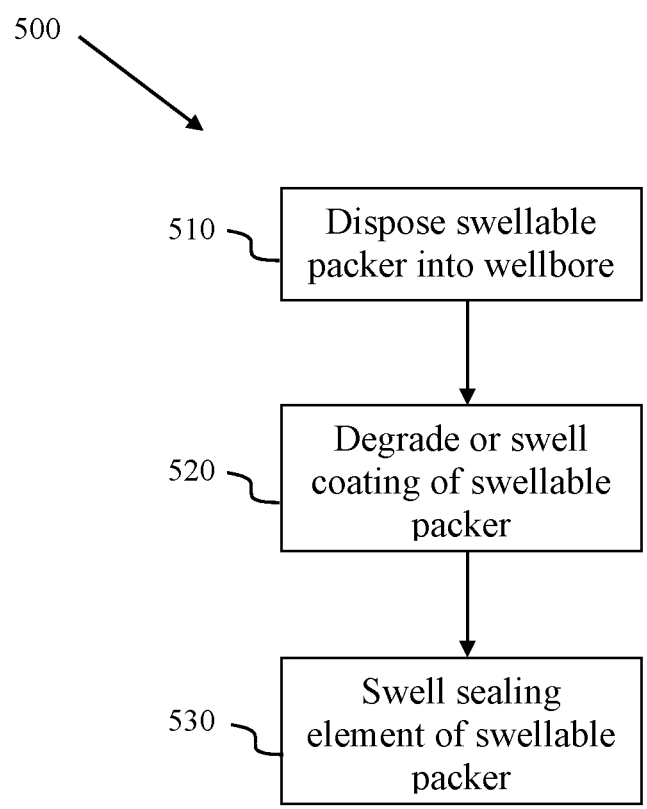
FIG. 4 is a is a flow diagram of a method for implementing one or more embodiments of the present disclosure.

Referring to FIG. 4, with continuing reference to FIGS. 1-3, a method of isolating a portion of a wellbore 114 is generally referred to by the reference numeral 500. The method 500 includes, at a step 510, disposing a tubular string 120 comprising a swellable packer 200 incorporated therein within a wellbore 114 in a subterranean formation 102. The swellable packer 200 is as described above. At a step 520, the method 500 further includes introducing a second wellbore fluid, in which the delay coating is swellable and/or degradable, within the wellbore 114 to cause the coating 230 of the swellable packer 200 to swell or degrade. Lastly, at a step 530, the method includes introducing a first wellbore fluid, in which the sealing element 220 is swellable, within the wellbore 114 to cause the sealing element 220 to swell such that the sealing element 220 exhibits a radial expansion. In the method 500, the second wellbore fluid may be the same or different from the first wellbore fluid.

It is understood that variations may be made in the foregoing without departing from the scope of the present disclosure. In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The present disclosure describes a wellbore isolation device including a mandrel, a sealing element disposed around at least a portion of the mandrel, wherein the sealing element includes a swellable material, and a delay coating disposed on at least a portion of an outer surface of the sealing element, wherein the delay coating includes a cross-linked polymer, and the delay coating is configured to swell or degrade in a wellbore fluid. In some aspects, the delay coating has a glass transition temperature of from 80° F. to 180° F. In some aspects, the delay coating has a dissolution rate in water of 0.01 mm/day to 1.0 mm/day at a temperature of 200° F. In some aspects, the delay coating has a dissolution rate in water of 0.05 mm/day to 0.75 mm/day at a temperature of 200° F. In some aspects, the cross-linked polymer is cross-linked by exposure to at least one of ultraviolet radiation, infrared radiation, or microwave radiation. In some aspects, the delay coating includes a thiol polymer. In some aspects, the delay coating is a tape wound around the outer surface of the sealing element. In some aspects, the delay coating includes a thiol polymer. In some aspects, the cross-linked polymer is cross-linked by exposure to at least one of ultraviolet radiation, infrared radiation, or microwave radiation.

The present disclosure also describes a method of isolating a portion of a wellbore including: disposing a tubular string including a wellbore isolation device incorporated therein within a wellbore in a subterranean formation, wherein the wellbore isolation device includes: a cylindrical sealing element with an internal bore, wherein the sealing element includes a swellable material that is configured to swell in a first wellbore fluid; and a delay coating disposed on at least a portion of an outer surface of the sealing element, wherein the delay coating includes a cross-linked polymer and is configured to swell or degrade in a second wellbore fluid, introducing the second wellbore fluid within the wellbore to cause the delay coating to swell or degrade; and introducing the first wellbore fluid within the wellbore to cause the sealing element to swell such that the sealing element exhibits a radial expansion, wherein the second wellbore fluid may be the same or different from the first wellbore fluid. In some aspects, the delay coating is disposed on an entire outer surface of the sealing element and provides a fluid-tight seal between the outer surface of the sealing element and the wellbore. In some aspects, the delay coating has a glass transition temperature of from 80° F. to 180° F. In some aspects, the delay coating includes a thiol polymer. In some aspects, the first wellbore fluid is different from the second wellbore fluid.

The present disclosure also describes a method of manufacturing a wellbore isolation device including: disposing a sealing element around at least a portion of a cylindrical mandrel, wherein the sealing element includes a swellable material; and disposing a coating on at least a portion of an outer surface of the sealing element, wherein the delay coating includes a cross-linked polymer and is configured to swell or degrade in a wellbore fluid. In some aspects, disposing the coating includes: spraying a liquid onto the outer surface of the sealing element, wherein the liquid includes a cross-linkable polymer; and cross-linking the cross-linkable polymer. In some aspects, cross-linking the cross-linkable polymer includes: exposing the sprayed liquid to at least one of ultraviolet radiation, infrared radiation, or microwave radiation. In some aspects, cross-linking the cross-linkable polymer includes: spraying a second liquid onto the sprayed liquid. In some aspects, disposing the coating includes: winding a tape including the cross-linked polymer around the sealing element.

What is claimed is:

1. A wellbore isolation device comprising:
   a mandrel;
   a sealing element disposed around at least a portion of the mandrel, wherein the sealing element comprises a swellable material; and
   a delay coating disposed on at least a portion of an outer surface of the sealing element, wherein the delay coating comprises a cross-linked polymer, and the delay coating is configured to swell or degrade in a wellbore fluid;
   wherein the delay coating comprises a thiol polymer comprising a swellable functional group selected from a polyethylene glycol-based hydrogel, an aerogel, poly(lactic acid), poly(glycolic acid), poly(vinyl alcohol), and/or poly(N-isopropylacrylamide).

2. The wellbore isolation device according to claim 1, wherein the delay coating has a glass transition temperature of from 80° F. to 180° F.

3. The wellbore isolation device according to claim 1, wherein the delay coating has a dissolution rate in water of 0.01 mm/day to 1.0 mm/day at a temperature of 200° F.

4. The wellbore isolation device according to claim 1, wherein the delay coating has a dissolution rate in water of 0.05 mm/day to 0.75 mm/day at a temperature of 200° F.

5. The wellbore isolation device according to claim 1, wherein the cross-linked polymer is cross-linked by exposure to at least one of ultraviolet radiation, infrared radiation, or microwave radiation.

6. The wellbore isolation device according to claim 1, wherein the delay coating is a tape wound around the outer surface of the sealing element.

7. The wellbore isolation device according to claim 6, wherein the cross-linked polymer is cross-linked by exposure to at least one of ultraviolet radiation, infrared radiation, or microwave radiation.

8. The wellbore isolation device according to claim 1, wherein the swellable functional group comprises a polyethylene glycol-based hydrogel or an aerogel.

9. The wellbore isolation device according to claim 1, wherein the swellable functional group comprises poly(lactic acid).

10. The wellbore isolation device according to claim 1, wherein the swellable functional group comprises poly(glycolic acid).

11. A method of isolating a portion of a wellbore comprising:
    disposing a tubular string comprising a wellbore isolation device incorporated therein within a wellbore in a subterranean formation, wherein the wellbore isolation device comprises:
      a cylindrical sealing element with an internal bore, wherein the sealing element comprises a swellable material that is configured to swell in a first wellbore fluid; and
      a delay coating disposed on at least a portion of an outer surface of the sealing element, wherein the delay coating comprises a cross-linked polymer and is configured to swell or degrade in a second wellbore fluid,
    introducing the second wellbore fluid within the wellbore to cause the delay coating to swell or degrade; and
    introducing the first wellbore fluid within the wellbore to cause the sealing element to swell such that the sealing element exhibits a radial expansion,
    wherein the second wellbore fluid may be the same or different from the first wellbore fluid; and
    wherein the delay coating comprises a thiol polymer comprising a swellable functional group selected from a polyethylene glycol-based hydrogel, an aerogel, poly (lactic acid), poly(glycolic acid), poly(vinyl alcohol), and/or poly(N-isopropylacrylamide).

12. The method according to claim 11, wherein the delay coating is disposed on an entire outer surface of the sealing element and provides a fluid-tight seal between the outer surface of the sealing element and the wellbore.

13. The method according to claim 11, wherein the delay coating has a glass transition temperature of from 80° F. to 180° F.

14. The method according to claim 11, wherein the first wellbore fluid is different from the second wellbore fluid.

15. The wellbore isolation device according to claim 11, wherein the swellable functional group comprises a polyethylene glycol-based hydrogel or an aerogel.

16. A method of manufacturing a wellbore isolation device comprising:
   disposing a sealing element around at least a portion of a cylindrical mandrel, wherein the sealing element comprises a swellable material; and
   disposing a delay coating on at least a portion of an outer surface of the sealing element, wherein the delay coating comprises a cross-linked polymer and is configured to swell or degrade in a wellbore fluid,
   wherein disposing the delay coating comprises spraying a first liquid onto the outer surface of the sealing element, wherein the first liquid comprises a cross-linkable polymer, and then spraying a second liquid onto the first liquid to cure the first liquid,
   wherein the delay coating comprises a thiol polymer comprising a swellable functional group selected from a polyethylene glycol-based hydrogel, an aerogel, poly(lactic acid), poly(glycolic acid), poly(vinyl alcohol), and/or poly(N-isopropylacrylamide).

17. The method according to claim 16, further comprising cross-linking the cross-linkable polymer.

18. The method according to claim 17, wherein cross-linking the cross-linkable polymer comprises: exposing the first and second liquids to at least one of ultraviolet radiation, infrared radiation, or microwave radiation.

19. The method according to claim 16, wherein disposing the delay coating comprises: winding a tape comprising the cross-linked polymer around the sealing element.

20. The method according to claim 16, wherein the second liquid comprises a catalyst, a cross-linking agent, and/or a hardener.

* * * * *